(12) United States Patent
Chamberlain

(10) Patent No.: US 6,185,067 B1
(45) Date of Patent: Feb. 6, 2001

(54) DISK DRIVE WITH REDUCED THERMAL EXPANSION INDUCED DISK SLIP

(75) Inventor: Stanley Case Chamberlain, Rochester, MN (US)

(73) Assignee: Western Digital Corporation, Irvine, CA (US)

( * ) Notice: Under 35 U.S.C. 154(b), the term of this patent shall be extended for 0 days.

(21) Appl. No.: 09/099,129

(22) Filed: Jun. 17, 1998

(51) Int. Cl.$^7$ ............................ G11B 25/04; G11B 17/02; H02K 5/04
(52) U.S. Cl. ............................ 360/99.08; 310/67 R
(58) Field of Search .............. 360/98.08, 99.12; 310/90, 67 R

(56) References Cited

U.S. PATENT DOCUMENTS

| | | | | |
|---|---|---|---|---|
| 4,604,665 | * | 8/1986 | Muller et al. | 360/97.02 |
| 4,717,977 | | 1/1988 | Brown . | |
| 4,814,652 | * | 3/1989 | Wright | 360/98.07 |
| 5,047,677 | * | 9/1991 | Mineta et al. | 310/67 R |
| 5,091,809 | * | 2/1992 | Connors et al. | 360/99.08 |
| 5,148,338 | * | 9/1992 | Fruge | 360/98.07 |
| 5,295,028 | * | 3/1994 | Elsing | 360/97.01 |
| 5,594,606 | * | 1/1997 | Hans et al. | 360/99.08 |

FOREIGN PATENT DOCUMENTS

| | | | |
|---|---|---|---|
| 0 521 437A2 | * | 1/1993 | (EP) . |
| 0 874 364A2 | * | 10/1998 | (EP) . |
| 63-257429 | * | 10/1988 | (JP) . |
| 64-66883 | * | 3/1989 | (JP) . |
| 2-81364 | * | 3/1990 | (JP) . |
| 2-240889 | * | 9/1990 | (JP) . |
| 4-210745 | * | 7/1992 | (JP) . |
| 7-29293 | * | 1/1995 | (JP) . |

* cited by examiner

Primary Examiner—William Klimowicz
(74) Attorney, Agent, or Firm—Milad G. Shara

(57) ABSTRACT

A spindle motor for a disk drive includes a shaft, an aluminum hub, a bearing, a magnetic steel back iron, and a magnet. The hub includes an axial wall having an inner surface. The back iron has an upper portion and a lower portion. The hub is concentrically position about the shaft such that the inner surface extends along a direction of a longitudinal axis defined by the hub. The bearing is positioned between the hub and the shaft. The back iron is secured to the hub such that the upper portion abuts the inner surface, whereas the lower portion is spaced-apart radially from the inner surface, thereby forming a single gap between the back iron and the hub. Finally, the magnet is attached to the back iron such that an axial length of the magnet is substantially coextensive with an axial length of the back iron.

27 Claims, 2 Drawing Sheets

DISK DRIVE WITH REDUCED THERMAL EXPANSION INDUCED DISK SLIP

BACKGROUND OF THE INVENTION

1. Field of the Invention

The present invention relates to hard disk drives. More particularly, it relates to a disk drive spindle motor configured to reduce thermal expansion induced disk slip.

2. Description of the Prior Art and Related Information

A huge market exists for mass-market host computer systems such as servers, desktop computers, and laptop computers. To be competitive in this market, a hard disk drive must be relatively inexpensive, and must accordingly embody a design that is adapted for low-cost mass production. Numerous manufacturers compete in this huge market and collectively conduct substantial research and development, at great annual cost, to design and develop innovative hard disk drives to meet increasingly demanding customer requirements.

Each of numerous contemporary mass-market hard disk drive models provides relatively large capacity, often in excess of 1 gigabyte per drive. Nevertheless, there exists substantial competitive pressure to develop mass-market hard disk drives that have even higher capacities and that provide rapid access. Another requirement to be competitive in this market is that the hard disk drive must conform to a selected standard exterior size and shape often referred to as a "form factor." Generally, capacity is desirably increased without increasing the form factor or the form factor is reduced without decreasing capacity.

Satisfying these competing constraints of low-cost, small size, high capacity, and rapid access requires innovation in each of numerous components or subassemblies. Typically, the main subassemblies of a hard disk drive are a head disk assembly and a printed circuit board assembly.

The head disk assembly includes an enclosure including a base and a cover; at least one disk having at least one recording surface; a spindle motor causing each disk to rotate; and an actuator arrangement. The actuator arrangement includes a separate transducer for each recording surface, and is moveable to position each transducer relative to the recording surface. The printed circuit board assembly includes circuitry for processing signals and controlling operation of the drive. Improvements in spindle motor design, and in particular the relationship between the spindle motor and the rotating disk(s), have given rise to increased performance capabilities of the disk drive. For example, by centrally positioning the disk(s) directly to the spindle motor allows for the use of multiple disks, thereby increasing overall storage capacity. While this advancement has provided highly beneficial results, inherent characteristics of the spindle motor components and the disk media have also created certain design problems, as described below.

A disk drive spindle motor typically includes a central shaft, a bearing assembly, a stator, a magnet and a rotor ("hub"). The bearing assembly allows the hub to rotate about the shaft and the hub is concentrically positioned about the shaft. The magnet is normally divided into two or more arcuate sections, each of which is connected to an interior surface of the hub. Finally, the stator includes a series of coils and is concentrically positioned about the shaft, adjacent the magnet. With this general configuration, the various coils of stator are selectively energized to form an electromagnet that pulls/pushes on the rotor magnet sections, imparting a rotational motion onto the hub. Notably, the bearing assembly can assume a wide variety of forms, such as an upper and lower bearing portion, and locations and the disk(s) are typically directly secured to a flange portion of the hub. With this arrangement, rotation of the hub results in rotation of the attached disk(s).

The above-described spindle motor design may have certain problems due to the particular materials used for various components. As a starting point, it should be recognized that the disk(s) is typically made from aluminum. Conversely, at least some of the spindle motor components must be formed from steel (including magnetic steel). Steel and aluminum have different thermal coefficients of expansion. Because the disk drive, including the spindle motor and disks, is normally subjected to a wide temperature variation during manufacture subsequent storage and operation in a host computer, the resulting difference in thermal expansion may result in what is commonly referred to as "disk slip." Where, for example, the hub is made of steel, the aluminum-based disk(s) may "slip" relative to the hub flange when the disk drive is subjected to drastic variations in temperature.

In order to address potential disk slip, spindle motors incorporating a hub made of aluminum material have been envisioned. With this approach, it is believed that the hub and disk(s) will contract/expand in a virtually identical fashion so that the disk(s) will not slip relative to the hub flange. Importantly, where an aluminum hub is employed, an additional magnetic steel back iron must also be included with the spindle motor design to complete the magnetic circuit with the stator. The magnetic steel back iron is attached to the aluminum hub, between an inner surface of the hub and the separate magnet component.

While use of the aluminum hub may reduce disk slip resulting from expansion differences between the hub and the disk(s), other concerns arise. More particularly, the back iron is made of steel, having a thermal coefficient of expansion less than that of the aluminum hub, and is directly secured to the hub. Therefore, when the disk drive is subjected to drastic temperature variations, the aluminum hub will attempt to contract or expand at a greater rate than the steel back iron. The back iron impedes this natural contraction. However, an aluminum disk abutting the hub flange will contract and once the friction between the contact surface of the hub flange and the disk is overcome by the disk, disk slip may occur.

U.S. Pat. No. 4,717,977 discloses one way of solving problems resulting from different thermal coefficient of expansion rates for an aluminum sleeve ("hub") and an outer steel sleeve ("back iron") in a spindle motor of a disk drive. A magnet is attached to the outer steel sleeve in which the axial length of the outer steel sleeve is substantially greater than the axial length of the magnet. The problem is solved by having two clearances ('gaps') between the two sleeves. The two sleeves are secured together near the center of their overlapping areas. However, a spindle motor using such an approach is difficult to assemble which increases the costs of manufacturing the spindle motor.

Accordingly, substantial research and development efforts have been in expended to provide an improved spindle motor design that reduces thermal expansion induced disk slip while minimizing the manufacturing costs.

SUMMARY OF THE INVENTION

The present invention can be regarded as a spindle motor for a disk drive. The spindle motor includes a shaft, an aluminum hub, a bearing, a magnetic steel back iron and a magnet. The hub includes an axial wall having an inner surface. The back iron includes an upper portion and a lower portion. The shaft defines a longitudinal axis about which the hub is concentrically positioned. In this regard, the hub is positioned such that the inner surface extends along a direction of the longitudinal axis defined by the shaft. The bearing is positioned between the hub and the shaft. The back iron is positioned relative to the hub such that the upper portion of the back iron abuts the inner surface of the hub. Conversely, the lower portion of the back iron is spaced-apart radially from the inner surface of the hub, thereby forming a single gap between the back iron and the hub. Finally, the magnet is attached to the back iron. The magnet has an axial length which is substantially coextensive with an axial length of the back iron.

The present invention also can be regarded as a disk drive comprising a base, a spindle motor and a disk. The spindle motor is attached to the base and includes a shaft, an aluminum hub, a bearing, a magnetic steel back iron and a magnet. To this end, the hub includes an axial wall having an inner surface; whereas the back iron includes an upper portion and a lower portion. The shaft defines a longitudinal axis about which the hub is concentrically positioned such that the inner surface of the hub extends along a direction of the shaft axis. The bearing is positioned between the hub and the shaft. The back iron is positioned relative to the hub such that the upper portion of the back iron abuts the inner surface of the hub, while the lower portion of the back iron is spaced-apart radially from the inner surface of the hub. This arrangement creates a single gap between the back iron and the hub. The magnet is attached to the back iron. The magnet has an axial length which is substantially coextensive with an axial length of the back iron. Finally, the disk is mounted on the hub.

The present invention can also be regarded as a disk drive including a base and a spindle motor attached to the base. The spindle motor includes a shaft defining a longitudinal axis, a hub concentrically positioned about the shaft and made from a first material having a first thermal coefficient of expansion, the hub including an axial wall having an inner surface extending along a direction of the axis, a bearing positioned between the hub and the shaft, a magnetic steel back iron including an upper portion and a lower portion, the upper portion abutting the inner surface, and the lower portion spaced-apart radially from the inner surface thereby forming a single gap between the back iron and the hub, and a magnet attached to the back iron; the magnet having a axial length which is substantially coextensive with an axial length of the back iron. The disk drive further includes a disk mounted on the hub, the disk having a substrate made from a second material having a second thermal coefficient of expansion which is substantially the same as the first thermal coefficient of expansion. Preferably, the first material is steel and the second material is glass.

DETAILED DESCRIPTION OF A PREFERRED EMBODIMENT

Figure 1:
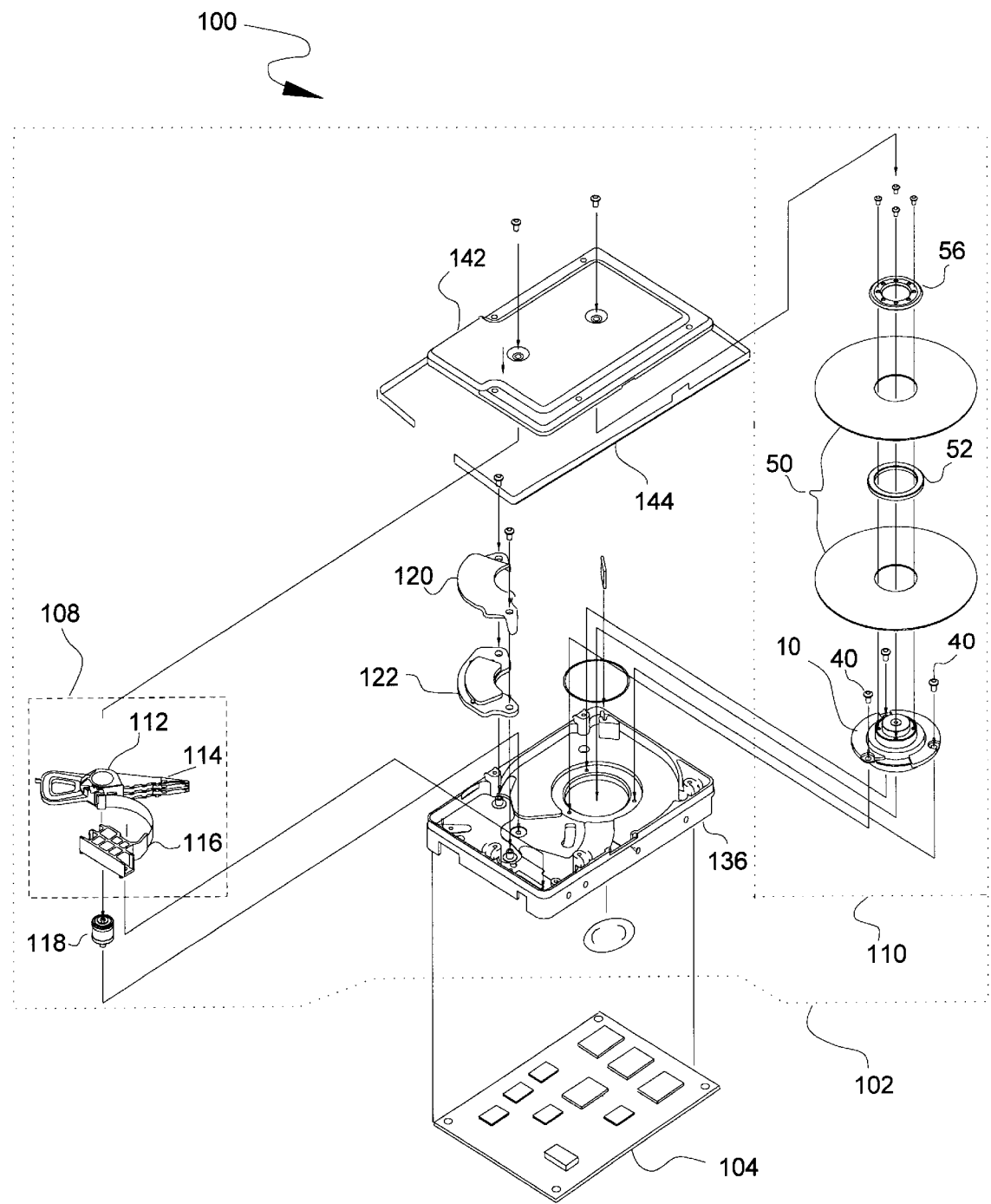
FIG. 1 is an exploded view of a hard disk drive in accordance with the present invention.

As shown in FIG. 1, a disk drive 10 embodying one preferred embodiment of the present invention includes a head disk assembly 12 and a printed circuit board assembly 14. The printed circuit board assembly 14 is suitably secured to an exterior of the head disk assembly 12 and controls operation of various components thereof The head disk assembly 12 includes an enclosure 16, a magnetic disk 18, a magnetic transducer 20, a rotary actuator arrangement 22 and a spindle motor generally indicated at 24. As described in greater detail below, the magnetic disk 18, the magnetic transducer 20, the rotary actuator arrangement 22 and the spindle motor 24 are maintained within the enclosure 16.

The enclosure 16 comprises a base 26 and a cover 28. The enclosure 16 is sealed to provide a relatively contaminant-free interior for remaining components of the head disk assembly 12. Suitably, a tape seal 30 is used to seal the enclosure 16.

The magnetic disk 18 and the magnetic transducer 20 are positioned within an interior of the enclosure 16. The magnetic disk 18 includes a recording surface 32. For example, in one preferred embodiment, the magnetic disk 18 has a substrate formed from aluminum, with the recording surface 32 including magnetic material deposited on the aluminum substrate. In an alternative embodiment, the substrate of magnetic disk 18 may be made from a material such as glass having a thermal coefficient of expansion of approximately 9 to 10 microinches per degree F. The particular embodiment shown in FIG. 1 includes a stack of two disks 18, providing four recording surfaces 32, and includes four magnetic transducers 20. Of course, the number of disks may be less than or greater than two.

The rotary actuator arrangement 22 provides for positioning of the magnetic transducers 20 over a selected area of the recording surface 32 of the magnetic disk 18. The rotary actuator arrangement 22 includes a permanent-magnet arrangement generally indicated at 34, a pivot bearing cartridge 36 and a head stack assembly 38. The pivot bearing cartridge 36 includes a stationary shaft secured to the enclosure 16 to define an axis of rotation for the rotary actuator arrangement 22. The head stack assembly 38 includes a flex circuit assembly 40, a coil 42 and actuator arms 44. Each one of the magnetic transducers 20 is secured to a respective one of the arms 44. During use, circuitry not shown causes current to conduct through the coil 42, and because the coil 42 lies in the magnetic field provided by the permanent magnet arrangement 34, a torque is applied to the head stack assembly 38. The amount and direction of that torque is subject to control of a servo system that controls the rotary position of the magnetic transducer 20 relative to the recording surface 32 of the magnetic disk 18. The disk 18 is mounted to the spindle motor 24 that causes each disk 18 to spin, preferably at a constant angular velocity.

Figure 2:
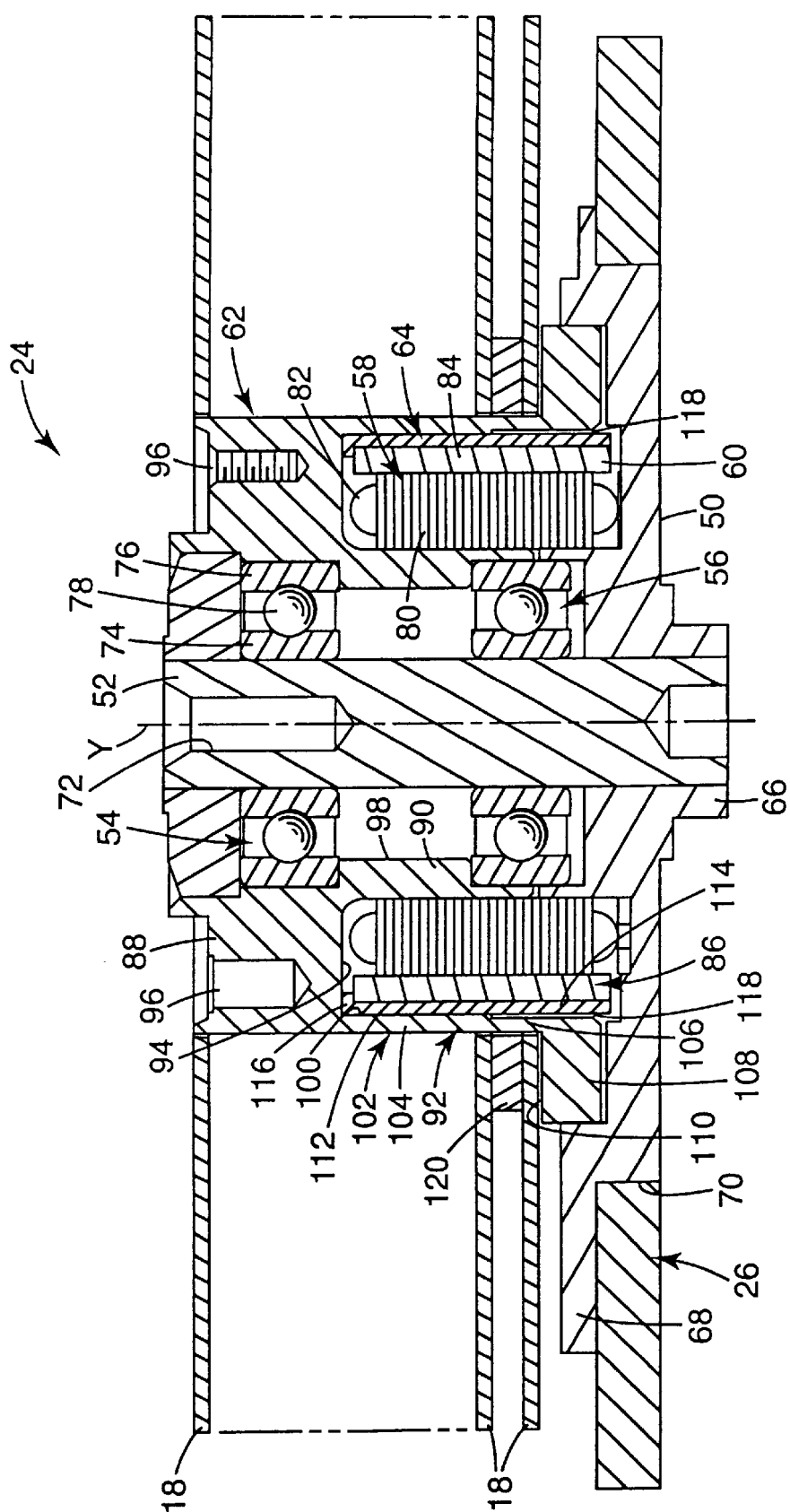
FIG. 2 is an enlarged, cross-sectional view of a portion of FIG. 1 which includes the spindle motor, the disk drive base, and a plurality of disks.

The spindle motor 24 is shown in more detail in FIG. 2. The spindle motor 24 includes a spindle motor base 50, a shaft 52, a first bearing 54, a second bearing 56, a stator 58, a magnet 60, a hub 62, and a back iron 64. Details of the various components are provided below. In general terms, however, the shaft 52 is secured to the spindle motor base 50. The first bearing 54 and the second bearing 56 rotatably secure the hub 62 to the shaft 52. The back iron 64 is secured to the hub 62. The magnet 60 is secured to the back iron 64. Finally, the stator 58 is concentrically positioned about the shaft 52, adjacent the magnet 60.

The spindle motor base 50 is made of a rigid material, such as aluminum, and is suitably sized to be received by the base 26 of the enclosure 16 (FIG. 1). More particularly, the spindle motor base 50 includes a central portion 66 and an upper flange 68. The base 26 defines an opening 70. The central portion 66 of the spindle motor base 50 has an outer diameter approximating a diameter of the opening 70, whereas the upper flange 68 has a diameter greater than the diameter of the opening 70. With this configuration, the spindle motor base 50 is sized to nest within the opening 70 such that the upper flange 68 abuts the base 26.

The shaft 52 is made of a rigid material, such as steel, and is suitably sized to be received by the spindle motor base 50. As shown in FIG. 2, the shaft 52 is configured to extend in a perpendicular fashion from the central portion 66 of the spindle motor base 50 so as to define a longitudinal axis Y. In one preferred embodiment, the shaft 52 includes a bore 72 suitably sized to receive a screw for securing the shaft 52 to the enclosure 16 (FIG. 1).

The first bearing 54 and the second bearing 56 each include an inner race 74, an outer race 76 and bearing balls 78. The inner race 74, the outer race 76 and the bearing balls 78 are suitably made from a hardened, bearing steel material.

The stator 58 preferably has a ring configuration, and includes a stator core 80 and wires generally shown at 82. The wires 82 are wound about the stator core 80, and are electrically connected to a current supply (not shown). In a preferred embodiment, the wires 82 include at least three wires wound about the stator core 80, each of the three wires defining a separate coil able to selectively receive an independent current supply. With this configuration, energizing one set of coils forms an electromagnet at that particular coil.

The magnet 60 is suitably in the shape of a ring, and is defined by a first half 84 and a second half 86. Both the first half 84 and the second half 86 of the magnet 60 are arcuate in shape, each having a radius slightly smaller than a radius of a portion of the hub 62 (described in greater detail below). As a result, the first half 84 and the second half 86 define separate magnetic poles such as eight poles which includes four north and four south poles.

The hub 62 is generally cylindrical in shape, having a central portion 88, a thrust surface 90 and an axial wall 92. The thrust surface 90 and the axial wall 92 extend axially from the central portion 88 as shown in FIG. 2. In this regard, extension of the thrust surface 90 and the axial wall 92 defines a slot 94 sized to provide clearance about the stator 58. In a preferred embodiment, the hub 62 is integrally formed from aluminum. In an alternative embodiment, the hub 62 may be made from a non-magnetic steel material, such as stainless steel, having a thermal coefficient of expansion of approximately 9–10 microinches per degree F. In such an embodiment, the thermal coefficient of expansion of a non-magnetic steel hub is substantially the same as the thermal coefficient of expansion of a magnetic disk having a glass substrate. In yet another alternative embodiment, the hub 62 may be made from glass.

Suitably, the central portion 88 of the hub 62 is sized to receive a clamping device (not shown) via bores 96. More particularly, the clamping device is mounted to the hub, via screws extending into the bores 96, to mount the stack of disks 18 to the hub 62.

As described in greater detail below, the thrust surface 90 is suitably sized for attachment to the first bearing 54 and the second bearing 56. Thus, the thrust surface 90 includes a radial extension 98 having an inner diameter less than an outer diameter of the outer race 74 of each of the first and second bearings 54, 56.

The axial wall 92 is defined by an inner surface 100 and an outer surface 102, and includes an upper section 104, a lower section 106 and a flange 108. As shown in FIG. 2, the inner surface 100 has a slightly greater diameter along the lower section 106 in comparison to a diameter of the upper section 104. For example, in one preferred embodiment, the diameter of the inner surface 100 along the lower section 106 is in the range of approximately 0.00036–0.10 inch greater than the diameter of the inner surface 100 along the upper section 104. More preferably, the inner surface 100 increases by 0.04 inch (1.0 mm) in diameter along the lower section 106. It should be recognized that other diameter variations, either greater or smaller, might also be acceptable. The flange 108 extends in a radial fashion from a bottom of the lower section 106. The flange 108 is suitably sized to receive the disk 18, and defines a disk receiving surface 110. Thus, upon final assembly, the disk 18 is mounted to the disk receiving surface 110 of the flange 108.

The back iron 64 is ring-shaped, and is defined by an upper portion 112 and a lower portion 114. The back iron 64 is suitably integrally formed from a magnetic steel material, and has an axial length substantially coextensive with an axial length of the magnet 60. Further, the back iron 64, in one preferred embodiment, has an axial length slightly greater than a length of the axial wall 92 of the hub 62, and the axial length of the magnet 60 is less than the axial length of the back iron 64. The back iron 64 is suitably sized to maintain the magnet 60. In this regard, the upper portion 112 includes a radially extending lip 116.

The spindle motor 24 is assembled substantially as follows. The shaft 52 is secured to the spindle motor base 50, such as by a press fitting operation. As shown in FIG. 2, the shaft 52 extends from the spindle motor base 50 in a generally perpendicular fashion to define the longitudinal axis Y. The first bearing 54 and the second bearing 56 are then secured to the shaft 52. For example, the inner race 74 of the second bearing 56 is secured to the shaft 52 proximal the spindle motor base 50. The inner race 74 of the first bearing 54 is secured to the shaft 52 axially spaced from the second bearing 56. The stator 58 is concentrically positioned about the shaft 52, adjacent to the spindle motor base 50.

The hub 62, the back iron 64 and the magnet 60 are assembled and then positioned about the shaft 52. For example, the back iron 64 is mounted to the hub 62. More particularly, the back iron 64 is secured to the inner surface 100 of the axial wall 92, such as with an adhesive, press fit, or other mounting method. As shown in FIG. 2, the axial wall 92 and the back iron 64 are configured to create a single gap 118 between the inner surface 100 of the axial wall 92 and the lower portion 114 of the back iron 64. In other words, the upper portion of the back iron 64 abuts the inner surface 100 of the axial wall 92, whereas the lower portion 114 of the back iron 64 is spaced-apart radially from the inner surface 100 of the axial wall 92.

The single gap 118 is preferably generated by the previously described diameter variation of the inner surface 100 of the axial wall 92. Once again, the upper section 104 of the axial wall 92 has a slightly lesser diameter than the lower section 106. As a result, the upper portion 112 of the back iron 64 abuts the inner surface 100, whereas the lower portion 114 of the back iron 64 is spaced-apart radially from the inner surface 100. The minimum width of the single gap 118 is preferably greater than the back iron diameter x the temperature change from ambient to minimum storage temperature (70 degrees F to –40 degrees F=110 degrees F)×the difference in the thermal coefficient of expansion values between the aluminum hub and the back iron (13–6=7 microinches per degree F) all divided by two. Preferably, such a minimum width is approximately 0.002 inch.

Alternatively, the single gap 118 can be formed by shaping the back iron 64 such that the lower portion 114 has a thickness less than a thickness of the upper portion 112. With this configuration, the diameter of the inner surface 100 can be continuous, but will again result in the upper portion 112 abutting the inner surface 100 and the lower portion 114 being space-apart radially.

Regardless of the exact design, the single gap 118 extends in an axial fashion, providing clearance between the back iron 64 and the axial wall 92 of the hub 62. In particular, at least a portion of the single gap 118 extends adjacent to the flange 108 so as to provide clearance between the back iron 64 and the flange 108. For example, in one preferred embodiment, the single gap 118 extends axially beyond the disk receiving surface 110 of the flange 108. Alternatively, to ensure adequate clearance for reasons described below, the single gap 118 has a length at least twice a thickness of the axial wall 92. More particularly, in one preferred embodiment, the single gap 118 is defined by a minimum axial length in the range of approximately 0.1–5.0 mm, more preferably 2 mm. It should be understood, however, that the single gap 118 may have an axial length much greater than 2 mm.

Once the back iron 64 is secured to the hub 62, the magnet 60 is secured to the back iron 64. As shown in FIG. 2, the magnet 60 is attached to a length of the back iron 64, including the radial lip 116. The magnet 60 may be suitably secured to the back iron 64 with an adhesive.

The hub 62, including the back iron 64 and the magnet 60 is then concentrically positioned about the shaft 52 such that the inner surface 100 of the axial wall 92 extends along a direction of the longitudinal axis Y. Similarly, the single gap 118 extends along a direction of the longitudinal axis Y. The thrust surface 90 bears upon the first bearing 54 and the second bearing 56. In this regard, the radial extension 98 is suitably press fitted between the first bearing 54 and the second bearing 56. Regardless of the exact form of attachment, the thrust surface 90 is mounted to the outer race 76 of the first and second bearings 54, 56 so that the hub 62 can rotate about the shaft 52 via the first and second bearings 54, 56. Placement of the hub 62 about the shaft 52 positions the stator 58 within the slot 94 of the hub 62. As shown in FIG. 2, the stator 58 is substantially coextensive with the magnet 60.

Following assembly, the spindle motor 24 is mounted to the base 26. The upper flange 68 of the spindle motor base 50 abuts the base 26, whereas the central portion 66 nests within the opening 70 in the base 26. Finally, each disk 18 is mounted to the hub 62, with a bottom disk abutting the disk receiving surface 110 of the flange 108. While the bottom disk is in direct contact with the disk receiving surface 110, each disk 18 is centrally spaced-apart radially from the outer surface 102 of the axial wall 92. FIG. 2 depicts a stack of disks 18, with a spacer 120 between any two given disks. The disks 18, along with a respective spacer 120, are secured to the disk receiving surface 110 by a clamping device (not shown) attached to the central portion 88 of the hub 62.

Upon final assembly, the single gap 118 suitably extends to a point at least above the disk receiving surface 110. Notably, while the single gap 118 may have an axial length extending adjacent to the second bearing 56, the single gap 118 does not extend to a point adjacent the first bearing 54.

The single gap 118 serves to reduce thermal expansion induced disk slip. For example, the above-described assembly process normally takes place in a clean room at temperatures in the range of approximately 60 to 70 degrees Fahrenheit. Following assembly, however, the disk drive 10 (FIG. 1) is normally stored at much colder temperatures, in the range of approximately −50 to −30 degrees Fahrenheit. During this drastic change in temperature, the various components of the disk drive 10 contract or shrink at different rates due to the thermal coefficients of expansion associated with each particular component. The hub 62 and the disk 18 are made of aluminum and have a thermal coefficient of expansion rate of approximately 13 microinches per degree Fahrenheit. The back iron 64 is made of magnetic steel having a thermal coefficient of expansion rate of approximately 6 microinches per degree Fahrenheit. Thus, as the disk drive 10 is cooled, e.g. during storage, the hub 62 contracts at a faster rate than the back iron 64. Because the back iron 64 is made of a relatively strong material, the back iron 64 will act to prevent the hub 62 from contracting at its natural rate. The difference in thermal expansion is of particular concern in the region of the flange 108. It will be recalled that the bottom disk is in direct contact with the disk receiving surface 110 of the flange 108, but is radially spaced-apart from the outer surface 102 of the axial wall 92. Without the single gap of the present invention, the back iron 64 prevents the axial wall 92 from contracting at the same rate as the disk 18. In other words, the disk 18 and the hub 62 can contract at different rates in the region of the outer surface 102 without the disk 18 ever contacting the outer surface 102. However, if the back iron 64 were to prevent the flange 108 from contracting at the same rate as the disk 18, the disk 18 might slip relative to the disk receiving surface 110. The single gap 118 of the present invention accounts for the difference in thermal expansion, allowing the flange 108 of the hub 62 to contract at the same rate as the disk 18. In other words, the back iron 64 does not impede the natural contraction of the flange 108 in the region of the single gap 118.

The disk drive 10 (FIG. 1) having the spindle motor 24 in accordance with the present invention greatly reduces the effects of thermal induced disk slip. First, the hub 62 is made of the same aluminum material as the disk 18 so that the hub 62 and the disk 18 will contract at the same rate. Further, the single gap 118 allows the flange 108, to which the disk 18 is mounted, to contract at the same rate as the disk 18. As a result, the disk 18 will not slip relative to the flange 108 when the disk drive 10 is subjected to low temperatures, which might otherwise affect the centricity of the disk 18 relative to the spindle motor 24. Importantly, the single gap design of the present invention can be effectuated by reducing the thickness of either the back iron 64 and/or the axial wall 92 of the hub 62. With this single gap configuration, the back iron 64 can be secured to the hub 62 with any of a number of relatively inexpensive attachment methods. Conversely, where two gaps are incorporated as in the prior art, a more complicated, and therefore relatively expensive, attachment approach is required.

I claim:

1. A spindle motor for a disk drive, the spindle motor comprising:

a shaft defining a longitudinal axis;

aluminum hub concentrically positioned about the shaft, the hub including an axial wall having an inner surface extending along a direction of the axis and including a flange extending radially from a bottom of the axial wall, the flange defining an upper disk receiving surface;

a bearing positioned between the hub and the shaft;

a magnetic steel back iron including an upper portion and a lower portion terminating at an end, the upper portion abutting the inner surface, and the lower portion extending below the disk receiving surface, the lower portion being spaced-apart radially from the inner surface thereby forming a single gap between the back iron and the hub, the single gap extending from a location above the disk receiving surface; and a magnet attached to the back iron, the magnet having an axial length which is substantially coextensive with an axial length of the back iron the magnet further terminating at an end that is aligned with the end of the back iron.

2. The spindle motor of claim 1, wherein the single gap extends beyond the disk receiving surface.

3. The spindle motor of claim 1, wherein the single gap is configured to provide a clearance between the back iron and the flange.

4. The spindle motor of claim 1, wherein the lower portion of the back iron is spaced-apart radially from the flange.

5. The spindle motor of claim 1, wherein the single gap has a length of at least 2 mm.

6. The spindle motor of claim 1, wherein the single gap has a length at least twice a thickness of the axial wall.

7. The spindle motor of claim 1, wherein the axial length of the magnet is less than the axial length of the back iron.

8. The spindle motor of claim 1, wherein the single gap extends along a direction of the axis.

9. The spindle motor of claim 1, wherein the axial wall has a reduced thickness adjacent the flange for forming the single gap.

10. The spindle motor of claim 1, wherein the lower portion of the back iron has a thickness less than a thickness of the upper portion for forming the single gap.

11. The spindle motor of claim 1, wherein the single gap extends to a location below the disk receiving surface.

12. A disk drive comprising:

a base;

a spindle motor attached to the base, the spindle motor comprising:

a shaft defining a longitudinal axis;

an aluminum hub concentrically positioned about the shaft, the hub including an axial wall having an inner surface extending along a direction of the axis and including a flange extending radially from a bottom of the axial wall, the flange defining an upper disk receiving surface and an opposing lower surface;

a bearing positioned between the hub and the shaft;

a magnetic steel back iron including an upper portion and a lower portion, the upper portion abutting the inner surface, and the lower portion extending below the disk receiving surface, the lower portion being spaced-apart radially from the inner surface thereby forming a single gap between the back iron and the hub, the single gap extending from a location above the disk receiving surface to the opposing lower surface, the magnetic steel back iron further terminating at an end that is below the opposing lower surface;

a magnet attached to the back iron, the magnet having an axial length which is substantially coextensive with an axial length of the back iron; and a disk mounted on the hub.

13. The disk drive of claim 12, wherein the single gap extends beyond the disk receiving surface.

14. The disk drive of claim 12, wherein the single gap is configured to provide a clearance between the back iron and the flange.

15. The disk drive of claim 12, wherein the lower portion of the back iron is spaced-apart radially from the flange.

16. The disk drive of claim 12, wherein the single gap has a length of at least 2 mm.

17. The disk drive of claim 12, wherein the single gap has a length at least twice a thickness of the axial wall.

18. The disk drive of claim 12, wherein the axial length of the magnet is less than the axial length of the back iron.

19. The disk drive of claim 12, wherein the axial wall has a reduced thickness adjacent the flange for forming the single gap.

20. The disk drive of claim 12, wherein the lower portion of the back iron has a thickness less than a thickness of the upper portion for forming the single gap.

21. The disk drive of claim 12, wherein the single gap extends to a location below the disk receiving surface.

22. A disk drive comprising:

a base;

a spindle motor attached to the base, the spindle motor comprising:

a shaft defining a longitudinal axis;

a hub concentrically positioned about the shaft and made from a first material having a first thermal coefficient of expansion, the hub including an axial wall having an inner surface extending along a direction of the axis and including a flange extending radially from a bottom of the axial wall, the flange defining an upper disk receiving surface;

a bearing positioned between the hub and the shaft;

a magnetic steel back iron including an upper portion and a lower portion terminating at an end, the upper portion abutting the inner surface, and the lower portion extending below the disk receiving surface, the lower portion being spaced-apart radially from the inner surface thereby forming a single gap between the back iron and the hub, the single gap extending from a location above the disk receiving surface;

a magnet attached to the back iron, the magnet having an axial length which is substantially coextensive with an axial length of the back iron, the magnet further terminating at an end that is aligned with the end of the back iron; and a disk mounted on the hub, the disk having a substrate made from a second material having a second thermal coefficient of expansion which is substantially the same as the first thermal coefficient of expansion.

23. The disk drive of claim 22 wherein the first and second materials are glass.

24. The disk drive of claim 22 wherein the first material is steel.

25. The disk drive of claim 24 wherein the second material is glass.

26. The disk drive of claim 25, wherein the single gap has a length at least twice a thickness of the axial wall.

27. The disk drive of claim 26, wherein the axial wall has a reduced thickness adjacent the flange for forming the single gap.

* * * * *